United States Patent [19]

Gill

[11] Patent Number: 5,613,765

[45] Date of Patent: Mar. 25, 1997

[54] HEADLIGHT MOUNTING APPARATUS

[75] Inventor: Avtar S. Gill, Peoria, Ill.

[73] Assignee: Caterpillar Inc., Peoria, Ill.

[21] Appl. No.: 608,780

[22] Filed: Feb. 29, 1996

[51] Int. Cl.$^6$ .............................. F21V 15/04; F21M 3/22
[52] U.S. Cl. .......................... 362/269; 362/287; 362/369; 362/426; 362/427
[58] Field of Search .............................. 362/61, 80, 369, 362/426, 269, 287, 427; 248/289.11, 291.1

[56] References Cited

U.S. PATENT DOCUMENTS

| | | | |
|---|---|---|---|
| 2,724,770 | 11/1955 | Onksen, Jr. | 362/369 |
| 3,505,515 | 4/1970 | Adra | 248/291.1 |
| 3,519,811 | 7/1970 | Jacobs | 362/426 |
| 4,103,323 | 7/1978 | Urbanek | 362/61 |
| 4,286,777 | 9/1981 | Brown | 267/63 |
| 4,295,691 | 10/1981 | Rubenthaler | 308/238 |
| 4,714,223 | 12/1987 | Kamaya | 248/291.1 |

*Primary Examiner*—Ira S. Lazarus
*Assistant Examiner*—Sara Sachie Raab
*Attorney, Agent, or Firm*—J. W. Burrows

[57] ABSTRACT

A headlight mounting apparatus for a headlight having a bulb mounted therein. The subject headlight mounting arrangement has a mounting portion integral with the headlight, a retaining mechanism and associated hardware, and a grommet arrangement of unique cross-sectional configuration which alters the frequency of vibration to a value significantly less than the natural frequency of vibration of the headlight bulb filament. This arrangement reduces bulb failures caused by shock experienced during vehicle/machine operation.

11 Claims, 6 Drawing Sheets

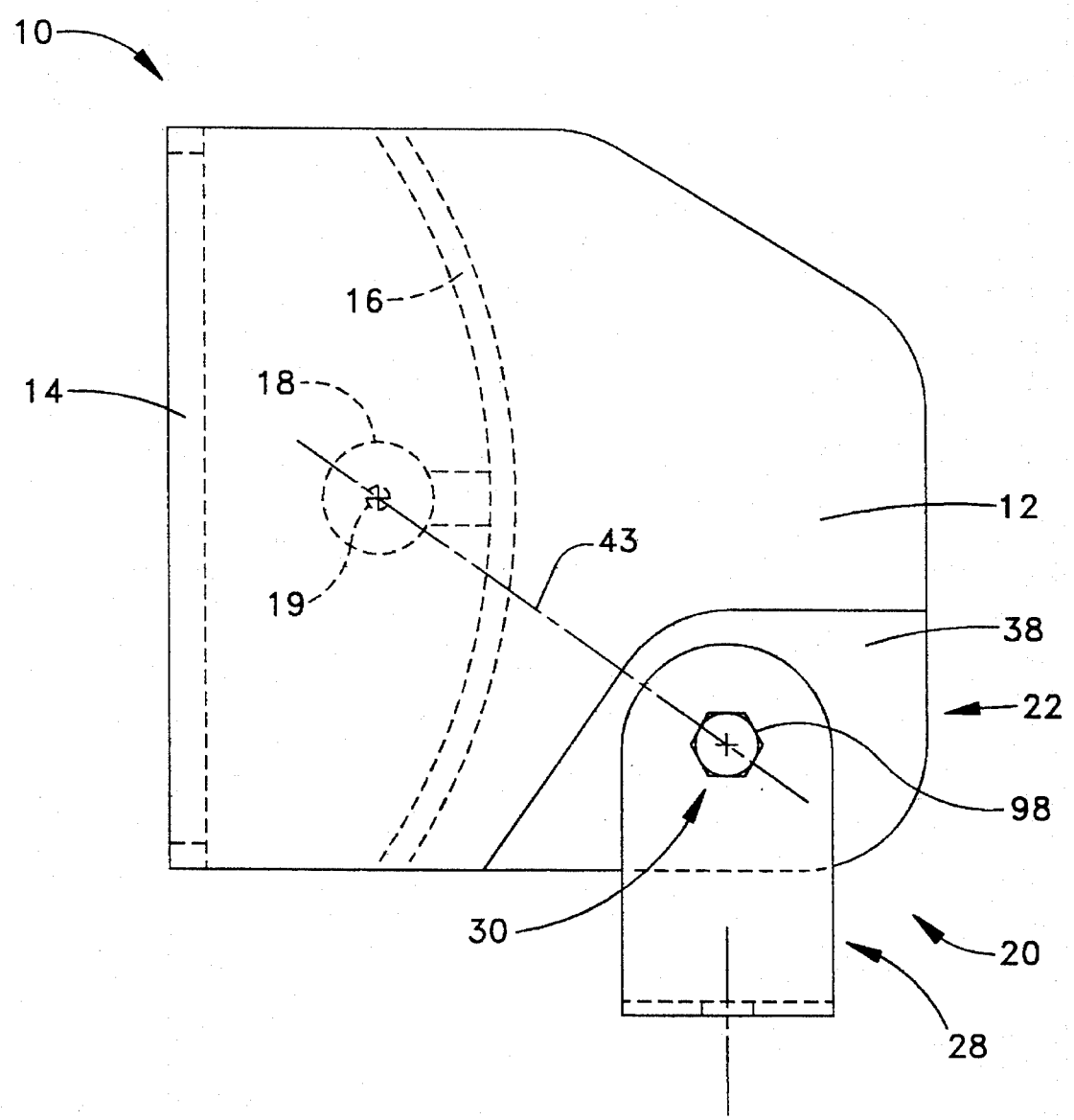
Fig_1_.

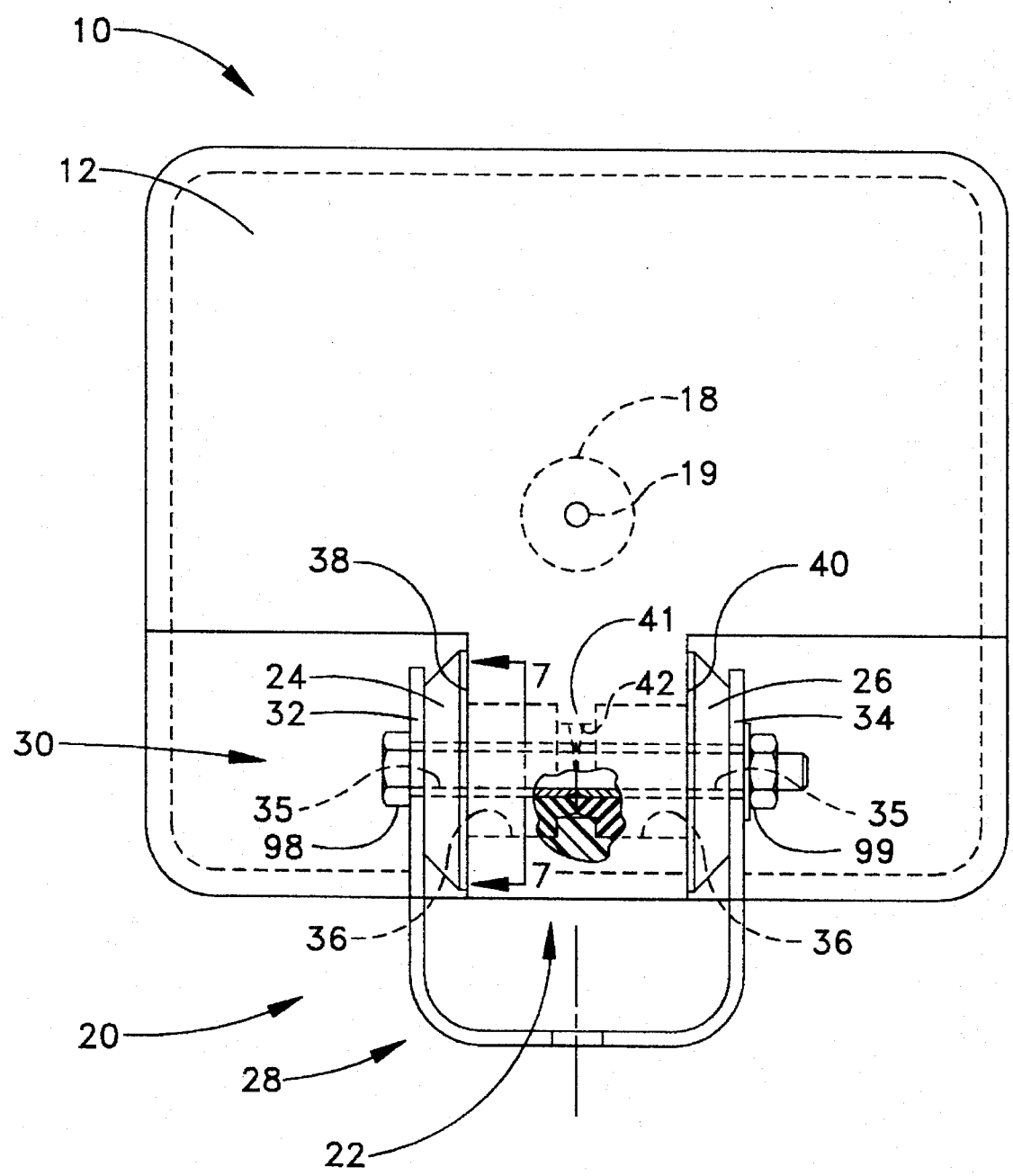
Fig_2_

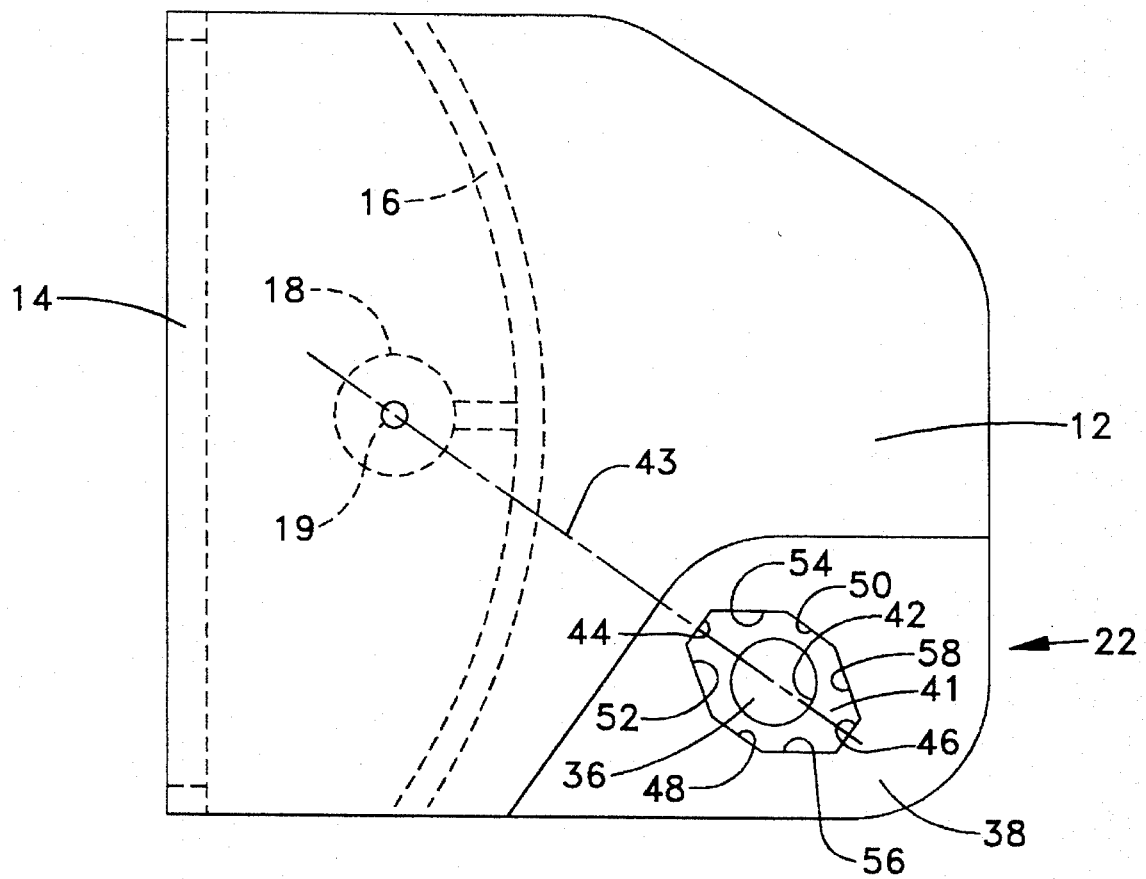

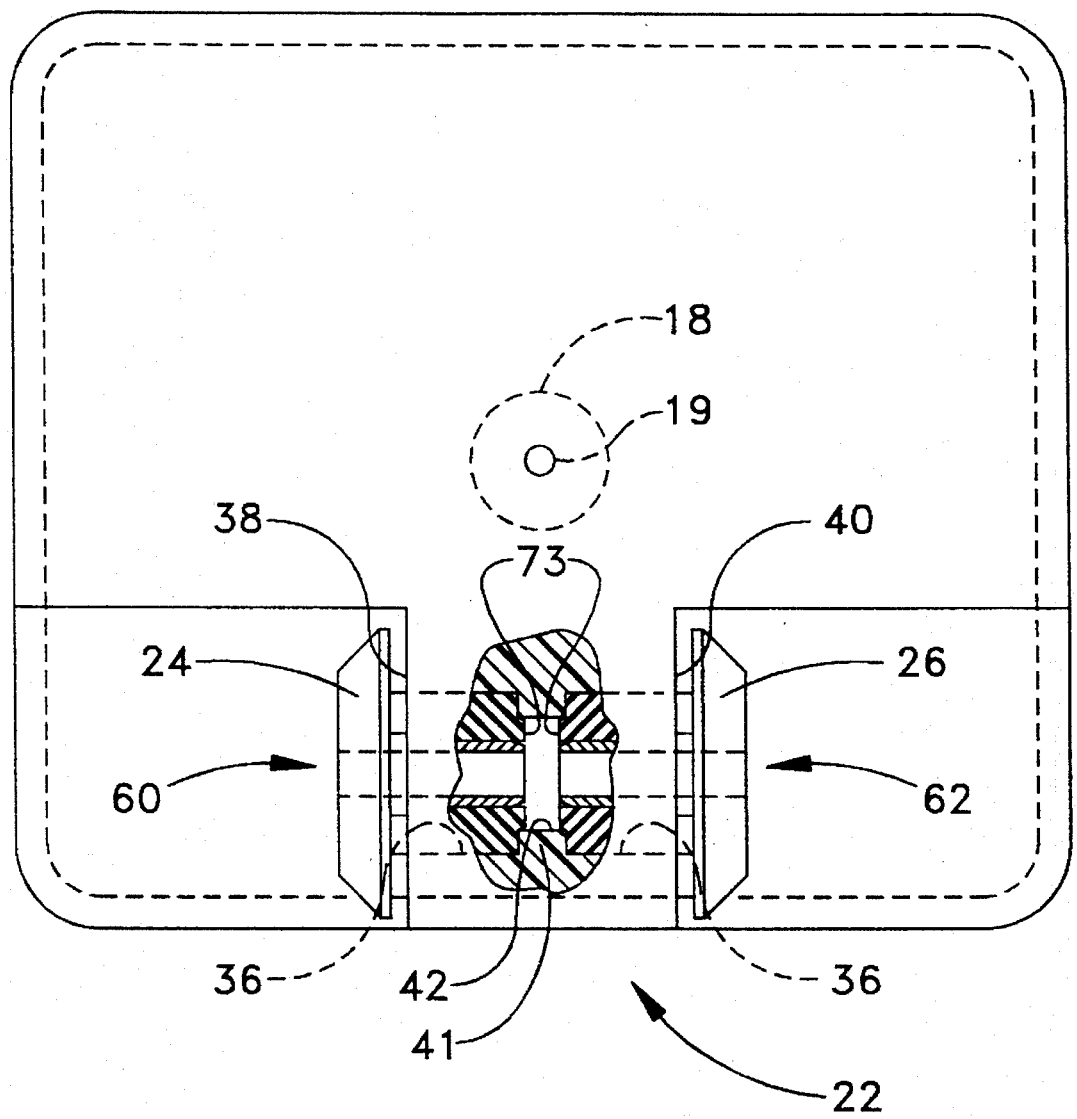

Fig_5_
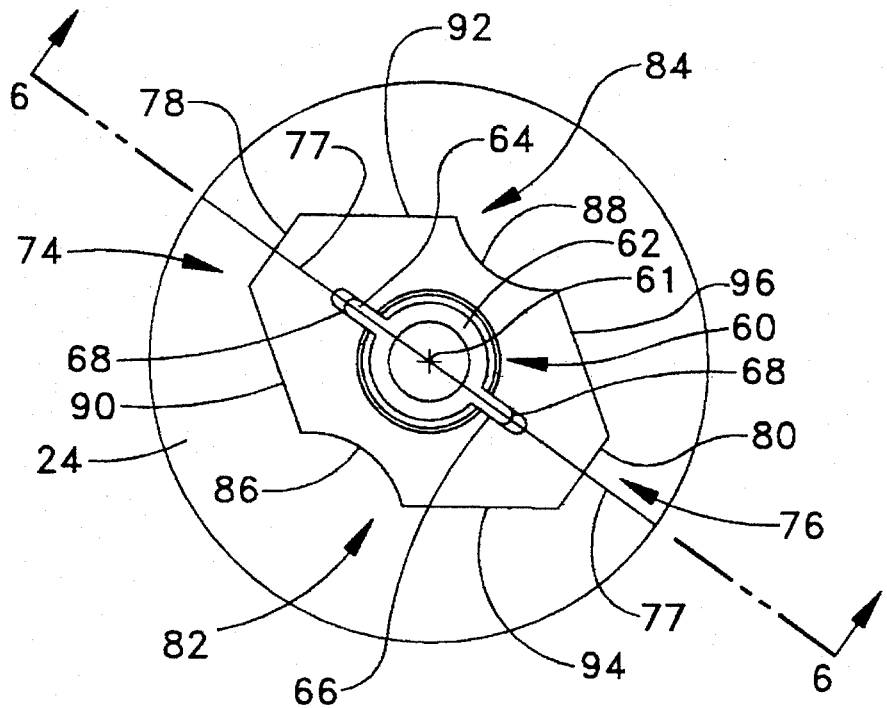
Fig_6_
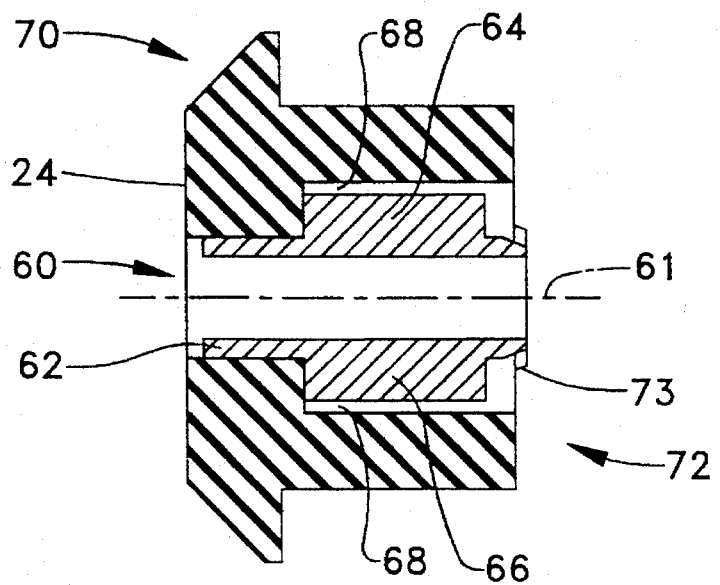

HEADLIGHT MOUNTING APPARATUS

TECHNICAL FIELD

The present invention relates to a mounting apparatus for connecting a headlight to a vehicle or machine. More particularly this invention relates to a mounting apparatus which modifies or alters the vibration frequency of the mounted headlight relative to the vehicle/machine.

BACKGROUND ART

The bulbs or filaments of headlights on vehicles or machines which travel over rough terrain generally experience heavy impacts which drastically shorten their life expectancy. Many grommets of various configurations have been developed to protect against the early failure of these bulbs or filaments. Recently, we have discovered that one of the major causes of such failures is vibration of the headlight housing or its mounting structure, which is excited by shock during operation, and the vehicle or machine that has natural frequencies close to the natural frequency of the filament in the bulb. This results in extremely high vibration of the filament causing its premature failure.

The present invention is directed to overcome one or more of the problems as set forth above.

DISCLOSURE OF THE INVENTION

In one aspect of the present invention a headlight mounting apparatus is provided for mounting a headlight on a machine. The headlight includes a housing having a lens, a bulb, and a reflector mounted thereon. The headlight mounting apparatus comprises a mounting portion with a longitudinal opening defined therein between opposed sidewalls, the longitudinal opening has an elongate cross-sectional configuration defining a reference plane extending through the center of the elongated portion transverse to the longitudinal opening define in the mounting portion. The elongate cross-sectional configuration of the opening has first and second opposed peripheral surfaces and third and fourth opposed peripheral surfaces oriented transverse to the first and second opposed peripheral surfaces. The elongate cross-sectional configuration is oriented within the mounting portion so that the reference plane defined therein extends through the centroid of the headlight bulb. A retaining mechanism is provided and includes first and second arms each with an opening defined therein and being adapted to connect the mounting portion of the headlight to the machine. The headlight mounting apparatus includes first and second elastomeric grommets each having first and second end portions and an opening extending longitudinally therethrough. Each of the first end portions is of a size greater than the opening in the mounting portion of the headlight housing or the openings in the respective first and second arms of the retaining element. Each of the first end portions is positioned between the respective first and second arms of the retaining mechanism and the respective sidewalls of the mounting portion. Each of the second end portions is of an elongate cross-sectional configuration with a reference plane defined through the elongated portion extending transverse to the longitudinal opening of the respective grommets. The elongate cross-sectional configuration of each of the grommets has first and second opposed peripheral portions on opposite sides of the longitudinal opening along the reference plane and third and fourth opposed peripheral portions on opposite sides of the longitudinal opening and oriented transverse to the first and second opposed peripheral portions. The first and second opposed peripheral portions each has a peripheral surface that is operative to slidably mate with the first and second opposed surfaces of the longitudinal opening of the mounting portion. The third and fourth opposed portions each has a peripheral surface that when initially assembled is spaced from the third and fourth opposed peripheral surfaces of the longitudinal opening of the mounting portion. The second end portion of each of the grommets is disposed in respective opposed ends of the longitudinal opening of the mounting portion and the reference plane defined in the respective grommets generally coincides with the reference plane in the longitudinal opening of the mounting portion. A fastening mechanism is provided and disposed through the openings of the respective first and second arms of the retaining mechanism, the longitudinal openings of the respective grommets, and the longitudinal opening of the mounting portion and, when secured, is operative to force the respective ends of the second end portion of the respective grommets into compression which forces the elastomeric material of the grommets to press outwardly against the first and second peripheral surfaces of the longitudinal opening in the mounting portion and to partially fill the space between the third and fourth opposed peripheral surfaces in the longitudinal opening of the mounting portion and the respective peripheral surfaces on the third and fourth portions of the respective grommets.

The present invention provides a headlight mounting apparatus that isolates the high frequency of the mounting structure, and thus cushions the headlight bulb from shocks due to vehicle/machine operation.

BRIEF DESCRIPTION OF THE DRAWINGS

FIG. 1 diagrammatically illustrates a side view of a headlight and mounting apparatus incorporating the subject invention;

FIG. 2 diagrammatically illustrates a rear view of a headlight and mounting apparatus incorporating the subject invention;

FIG. 3 diagrammatically illustrates the headlight and its housing;

FIG. 4 diagrammatically illustrates the headlight and housing with grommets disposed in the housing;

FIG. 5 diagrammatically illustrates an end view of one of the grommets;

FIG. 6 is a cross-sectional view taken along the line 6—6 of FIG. 5; and

BEST MODE FOR CARRYING OUT THE INVENTION

Figure 7:
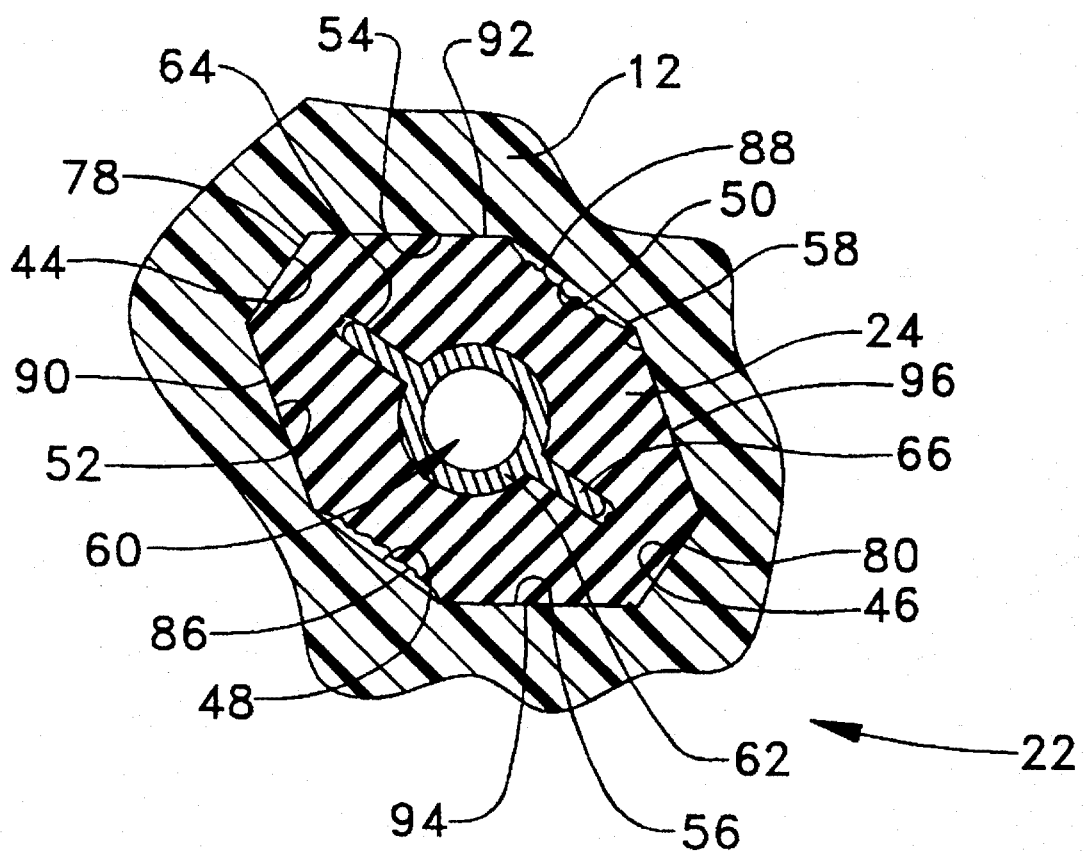
FIG. 7 is a partial cross-sectional view taken along the line 7—7 of FIG. 2.

Referring to FIGS. 1 and 2 of the drawings, a headlight assembly 10 is illustrated and adapted for use on a vehicle or machine (not shown) and includes a housing 12, a lens 14, a reflector 16, a bulb 18 having a filament 19, and a headlight mounting apparatus 20. The headlight mounting apparatus 20 includes a mounting portion 22 disposed on the housing 12, first and second grommets 24,26, a retaining mechanism 28, and a fastening mechanism 30. The housing 20 of the subject invention is made from a rigid plastic material. However, it is recognized that other rigid materials, such as metal, could be used without departing from the essence of the invention.

The retaining mechanism 28 in the subject embodiment is a "U" shaped member having first and second arms 32,34 with an opening 35 defined through each of the arms 32,34. It is recognized that other forms of the retaining mechanism 28 could be used. It is further noted that the "U" shaped member is reasonably thin in order to allow it to flex during assembly.

FIG. 3 and 4 illustrate the headlight housing 12 with the lens 14, the reflector 16 and the bulb 18 mounted thereon. The mounting portion 22 is a portion of the housing 12 and defines a longitudinal opening 36 extending therethrough between opposed sidewalls 38,40. A raised rib or web 41 is disposed in the longitudinal opening 36 generally midway between the opposed sidewalls 38,40. The web 41 illustrated herein defines a opening 42 therethrough that is round in cross-section. It is recognized that the web 41 could be a raised rib having a shape similar to the shape of the opening 36 to define the opening 42.

The longitudinal opening 36 is generally of an elongate cross-sectional configuration. A reference plane 43 is defined through the center of the elongated portion and, when extended, the reference plane 43 passes through the centroid of the bulb 18. The elongate cross-sectional configuration has first and second opposed peripheral surfaces 44,46 spaced from one another. The reference plane 43 passes generally through the mid-points of the first and second opposed peripheral surfaces 44,46. Third and fourth opposed peripheral surfaces 48,50 are spaced from one another and oriented transversely with respect to the first and second opposed peripheral surfaces 44,46. The spacing between the first and second opposed peripheral surfaces 44,46 is larger than the spacing between the third and fourth opposed surfaces 48,50.

Fifth and sixth peripheral surfaces 52,54 are located at opposite ends of the first peripheral surface 44 and extend to the respective third and fourth peripheral surfaces 48,50. Seventh and eighth peripheral surfaces 56,58 are located at opposite ends of the second peripheral surface 46 and extend to the respective third and fourth peripheral surfaces 48,50. As noted above the web 41 could be a raised rib generally conforming to the shape of the elongate cross-sectional configuration. Likewise, it is recognized that the shape of the web 41 could be of various forms or shapes having the opening 42 therethrough.

FIGS. 5, and 6 illustrate the respective first and second grommets 24,26 in greater detail. As illustrated, the grommets 24,26 are made substantially of an elastomeric material. It is recognized that various portions of the grommets 24,26 could be made from other materials. Since both of the grommets 24,26 are identical, only the grommet 24 will be described in detail. The grommet 24 has a longitudinal opening 60 defined therethrough along a longitudinal axis 61. In the subject design, a rigid sleeve 62 is disposed in the grommet 24 in intimate contact with the elastomeric material and an opening therethrough constitutes the longitudinal opening 60.

The rigid sleeve 62 has first and second flanges 64,66 attached to opposite sides of the rigid sleeve 62 and extending outwardly therefrom. The first and second flanges 64,66 extend along a portion of the sleeve length between the respective ends thereof. A void 68 of a predetermined size is defined at the outermost end of each of the first and second flanges 64,66 and along the longitudinal length thereof. When assembled in the mounting portion 22, the respective first and second flanges 64,66 extend outwardly from the rigid sleeve 62 generally along the reference plane 43.

The grommet 24 has first and second end portions 70,72 defined along its longitudinal axis 61. The first end portion 70 has a configuration larger than either of the longitudinal openings 35 through the arms 32,34 of the retaining mechanism 28 or the longitudinal opening 36 in the mounting portion 22. When installed, the first end portion 70 is disposed between the respective first and second arms 32,34 and the respective sidewalls 38,40.

The second end portion 72 of the respective grommets 24,26, when assembled, is disposed in opposite ends of the longitudinal opening 36 of the mounting portion 22. As more clearly shown in FIG. 5, the second end portion 72 has a pilot portion 73 disposed on the end thereof and an elongate cross-sectional configuration generally like the configuration of the longitudinal opening 36 in the mounting portion 22. The pilot portion 73 is generally round in shape and adapted to slip into the round opening 42 defined in the longitudinal opening 36 in the mounting portion 22. First and second opposed portions 74,76 are disposed on opposite sides of the longitudinal opening 60 therein and a reference plane 77 is defined through the midpoint of the first and second opposed portions 74,76 along the longitudinal length of the respective grommets 24,26. When assembled, the reference plane 77 generally lies along the reference plane 43 in the longitudinal opening 36 of the mounting portion 22.

First and second opposed peripheral surfaces 78,80 are located on the outermost ends of the respective first and second opposed portions 74,76. During assembly, the first and second peripheral surfaces 78,80 are slidably disposed within the longitudinal opening 36 relative to the first and second peripheral surfaces 44,46 of the longitudinal opening 36. Third and fourth opposed portions 82,84 are disposed on opposite sides of the longitudinal opening 36 therein and oriented transverse to the first and second opposed portions 74,76. Third and fourth opposed peripheral surfaces 86,88 are located on the outermost ends of the third and fourth opposed portions 82,84. The third and fourth opposed peripheral surfaces 86,88 of the subject embodiment are concave in shape. However, it is recognized that other shapes or a flat surface could be used herein. When the grommet 24 is placed in the longitudinal opening 36 of the mounting portion 22, the third and fourth peripheral surfaces 86,88 are spaced at a predetermined distance from the respective third and fourth peripheral surfaces 48,50 of the longitudinal opening 36 in the mounting portion 22.

The second portion 72 also has fifth and sixth peripheral surfaces 90,92 located at opposite ends of the first peripheral surface 78 and each extends to the respective third and fourth peripheral surfaces 86,88. Likewise, seventh and eighth peripheral surfaces 94,96 are located at opposite ends of the second peripheral surface 80 and each extends to the respective third and fourth peripheral surfaces 86,88. During assembly of the second end portion of the grommet 24 within the longitudinal opening 36 of the mounting portion 22, the fifth, sixth, seventh, and eighth peripheral surfaces 90,92,94,96 of the second portion 72 are slidably disposed with respect to the fifth, sixth, seventh, and eighth peripheral surfaces 52,54,56,58 within the longitudinal opening 36.

The fastening mechanism 30 of the subject embodiment includes a bolt 98 and a nut 99, as best illustrated in FIG. 2. After the bolt 98 is passed through the respective openings 35 in the arms 32,34, and the sleeves 62, the nut 99 is screwed on and secured or tightened. It is recognized that other types of fasteners may be used without departing from the essence of the invention.

FIG. 7 generally illustrates how the elastomeric material compresses once the fastening mechanism 30 has been properly secured or tightened. More specifically, as is clearly illustrated, the space between the third and fourth peripheral surfaces 86,88 and the third and fourth peripheral surfaces of the longitudinal opening 36 of the mounting portion 22 is reduced. Likewise when referring to FIG. 2, the ends of the rigid sleeves 62 are in contact with each other to control the degree of compression of the elastomeric material of the grommets 24,26.

INDUSTRIAL APPLICABILITY

During the tightening of the fastening mechanism 30, the elastomeric material of the respective grommets 24,26 is forced to compress. Since the ends of the respective second end portion 72 are in contact with the raised rib 42 prior to the nut 99 being tightened on the bolt 98, the elastomeric material must expand. Likewise, since the peripheral surfaces 78,80,90,92,94,98 of the grommets 24,26 are each in close slidable contact with the respective peripheral surfaces 44,46,52,54,56,58 within the longitudinal opening 36 of the mounting portion 22, the elastomeric material cannot expand in these areas. Therefore, the elastomeric material must expand into the spaces between the third and fourth peripheral surfaces 86,88 of the grommets 24,26 and the third and fourth peripheral surfaces 48,50 in the longitudinal opening 36 and the voids 68 at the outwardly most ends of the first and second flanges 64,66. By controlling the degree of compression and the space to be filled, the headlight mounting natural frequency can be varied.

It has been determined that headlight bulbs generally vibrate at a natural frequency of about 300 Hz. The natural frequencies of the headlight housing and its mounting structure, which are excited during machine operation, can be as low as 100 Hz. To avoid the transmission of the vibration at these frequencies to the bulb (filament), the headlight mounting frequency is effectively lowered well below 100 Hz. This is accomplished by compressing the elastomeric material enough to fill the noted spaces to within a range of 70 to 90 percent capacity.

Other aspects, objects and advantages of this invention can be obtained from a study of the drawings, the disclosure and the appended claims.

I claim:

1. A headlight mounting apparatus adapted to mount a head light on a machine, the headlight includes a housing having a lens, a bulb, and a reflector disposed thereon, the headlight mounting apparatus comprises:

a mounting portion with a longitudinal opening defined therein between opposed sidewalls, the opening has an elongate cross-sectional configuration defining a reference plane extending through the center of the elongated portion transverse to the longitudinal opening defined in the mounting portion, the elongate cross-sectional configuration of the opening has first and second opposed peripheral surfaces and third and fourth opposed peripheral surfaces oriented transverse to the first and second opposed peripheral surfaces, the elongate cross-sectional configuration is oriented within the mounting portion so that the reference plane defined therein extends through the centroid of the headlight bulb;

a retaining mechanism having first and second arms each with an opening defined therein and being adapted to connect the mounting portion of the headlight to the machine;

first and second elastomeric grommets each having first and second end portions and an opening extending longitudinally therethrough, each of the first end portions being of a size greater than the opening in the mounting portion of the headlight housing or the openings in the respective first and second arms of the retaining element and being positioned between the respective first and second arms of the retaining mechanism and the respective sidewalls of the mounting portion, each of the second end portions being of an elongate cross-sectional configuration with a reference plane defined through the elongated portion extending transverse to the longitudinal opening through the respective grommets, the elongate cross-sectional configuration of each of the grommets has first and second opposed peripheral portions on opposite sides of the longitudinal opening along the reference plane and third and fourth opposed peripheral portions on opposite sides of the longitudinal opening and oriented transverse to the first and second opposed peripheral portions, the first and second opposed peripheral portions each has a peripheral surface that is operative to slidably mate with the first and second opposed surfaces of the longitudinal opening of the mounting portion, the third and fourth opposed portions each has a peripheral surface that when initially assembled is spaced from the third and fourth opposed peripheral surfaces of the longitudinal opening of the mounting portion, the second end portion of each of the grommets is disposed in respective opposed ends of the longitudinal opening of the mounting portion and the reference plane defined in the respective grommets generally coincides with the reference plane defined in the longitudinal opening of the mounting portion; and a fastening mechanism disposed through the openings of the respective first and second arms of the retaining mechanism, the longitudinal openings of the respective grommets, and the longitudinal opening of the mounting portion and, when secured, is operative to force the respective ends of the second end portion of the respective grommets into compression which forces the elastomeric material of the grommets to press outwardly against the first and second peripheral surfaces of the longitudinal opening in the mounting portion and to partially fill the spaces between the third and fourth opposed peripheral surfaces in the longitudinal opening of the mounting portion and the respective peripheral surfaces on the third and fourth portions of the respective grommets.

2. The headlight mounting apparatus of claim 1 wherein, when the respective elastomeric grommets are compressed, the spaces between the third and fourth opposed peripheral surfaces in the longitudinal opening of the mounting portion and the respective peripheral surfaces on the third and fourth portions of the respective grommets are filled in the range of 70 to 90 percent.

3. The headlight mounting apparatus of claim 2 wherein the longitudinal opening in the mounting portion defines respective fifth and sixth peripheral surfaces on opposite sides of the first peripheral surface and respective seventh and eighth peripheral surfaces on opposite sides of the second peripheral surface, each of the elastomeric grommets has respective fifth and sixth peripheral surfaces on opposite sides of the first peripheral surface of the respective grommets and respective seventh and eighth peripheral surfaces on opposite sides of the second peripheral surface of the respective grommets, and during assembly, the fifth, sixth, seventh, and eighth peripheral surfaces of the respective grommets are in slidable contact with the respective fifth, sixth, seventh, and eighth peripheral surfaces of the longitudinal opening in the mounting portion and when the respective grommets are properly compressed the fifth, sixth, seventh, and eighth peripheral surfaces of the respective grommets are in compressive contact with the respective fifth, sixth, seventh, and eighth peripheral surfaces of the longitudinal opening in the mounting portion.

4. The headlight mounting apparatus of claim 3 wherein the spacing between the first and second opposed peripheral surfaces of the mounting portion is longer than the spacing between the third and fourth peripheral surfaces thereof.

5. The headlight mounting apparatus of claim 4 wherein each of the first and second grommets has a rigid sleeve disposed in the longitudinal opening and in intimate contact with the elastomeric material.

6. The headlight mounting apparatus of claim 5 wherein when initially assembled and unsecured, one end of each of the respective rigid sleeves are free from contact and when fully secured, the ends are in contact and limits the degree of compression of the elastomeric material.

7. The headlight mounting apparatus of claim 6 wherein first and second flanges are secured to opposite sides longitudinally along the respective sleeves and extend outwardly therefrom along a portion thereof.

8. The headlight mounting apparatus of claim 7 wherein the first and second flanges extend outwardly from the respective sleeves along the reference plane through the elongated portion of the respective second end portions of each grommet.

9. The headlight mounting apparatus of claim 8 wherein a void of a predetermined size is defined in the second end portion of each of the grommets at the outer most end of each flange and along its longitudinal length.

10. The headlight mounting apparatus of claim 9 wherein the third and fourth peripheral surfaces of each of the grommets have a concave shape.

11. The headlight mounting apparatus of claim 10 wherein a web having an opening defined therethrough is disposed in the longitudinal opening of the mounting portion generally midway between the opposed sidewalls and, when assembled, a portion of the ends of the respective second portions of the first and second grommets contacts the raised rib.

* * * * *

UNITED STATES PATENT AND TRADEMARK OFFICE
CERTIFICATE OF CORRECTION

PATENT NO. : 5,613,765
DATED : March 25, 1997
INVENTOR(S) : Avtar S. Gill

It is certified that error appears in the above-identified patent and that said Letters Patent is hereby corrected as shown below:

Column 2, line 64, delete "20" and insert --12--

Please correct the claims as follows:

Column 5, line 51, delete "the" (first occurrence) and insert --a--
Column 5, line 51, delete "the" (second occurrence) and insert --an--
Column 5, line 59, delete "the" (first occurrence) and insert --a--

Column 6, line 5, delete "element" and insert --mechanism--
Column 6, line 10, delete "the" and insert --an--
Column 6, line 43, delete "the" and insert --respective--
Column 6, line 53, delete "the" (second occurrence) and insert --a--

Column 7, line 3, delete "properly"
Column 7, line 9, delete "the" (first occurrence) and insert --a--
Column 7, line 10, delete "the" (second occurrence) and insert --a--
Column 7, line 18, delete "are" and insert --is--

Column 8, line 11, delete "its" and insert --a--
Column 8, line 11, after "length" add --of each flange.--
Column 8, line 18, delete "the ends of"
Column 8, line 18, insert --end-- after "second"

UNITED STATES PATENT AND TRADEMARK OFFICE
CERTIFICATE OF CORRECTION

PATENT NO.  : 5,613,765
DATED       : March 25, 1997
INVENTOR(S) : Avtar S. Gill It is certified that error appears in the above-indentified patent and that said Letters Patent is hereby corrected as shown below:

Column 8, line 19, and 20, delete "raised rib" and insert --web--

Signed and Sealed this

Twelfth Day of August, 1997

Attest:

BRUCE LEHMAN

*Attesting Officer*      *Commissioner of Patents and Trademarks*